INVENTOR.
William C. Gooch
BY
Wm. T. Wofford
Attorney

May 2, 1967 W. C. GOOCH 3,317,149
ELECTRIC CABLE STRINGING APPARATUS
Filed July 8, 1964 3 Sheets-Sheet 3
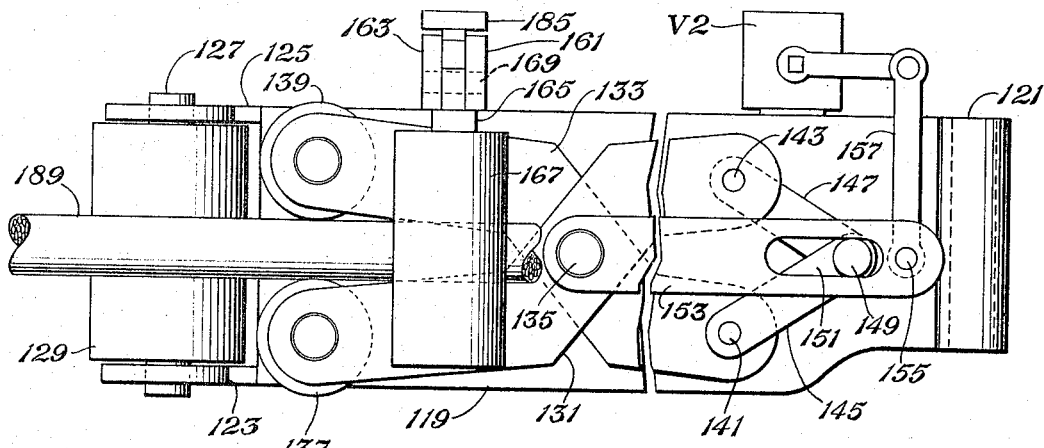
Fig. 4
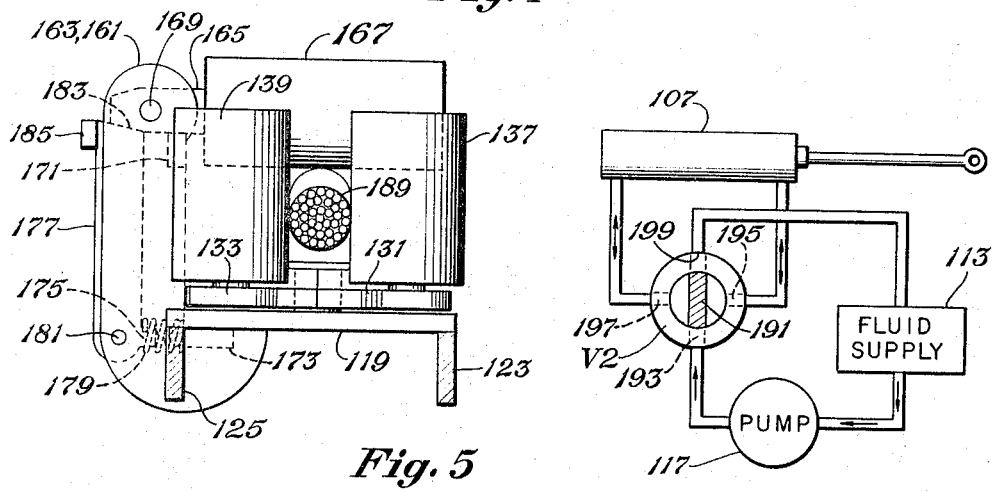
Fig. 5
Fig. 7
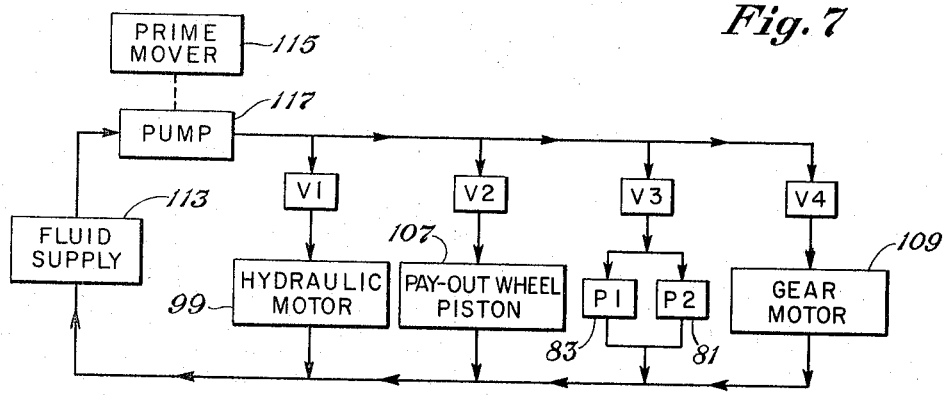
Fig. 6
INVENTOR.
William C. Gooch
BY Wm. T. Wofford
Attorney United States Patent Office 3,317,149
Patented May 2, 1967

3,317,149
ELECTRIC CABLE STRINGING APPARATUS
William C. Gooch, Fort Worth, Tex., assignor to Hydra-Pull Corporation, Fort Worth, Tex.
Filed July 8, 1964, Ser. No. 381,135
8 Claims. (Cl. 242—54)

My invention relates to cable stringing apparatus and more particularly to apparatus for stringing electrical power transmission cables in electric power distribution systems.

Prior art apparatus used for stringing electrical power transmission cables have a number of disadvantages. Generally, the electrical transmission cables are unwound from a cable reel, wound on a pay-out wheel and then discharged therefrom toward supporting towers. The same apparatus is used for rewinding transmission cables if for any reason it is desired that they be removed from their towers.

The prior art pay-out wheels with which I am familiar have multiple grooves in the periphery thereof, and the cables make several turns around such wheels. These multiple wrappings permit an increase in the frictional force and consequently, the cable is held so that suitable large tension forces may be applied during installation or removal.

The problem with using multiple wraps of the cable is that each wrap cold-works the metal (usually aluminum). The more bending and straightening of the cable, the more likely that minute or even large fatigue cracks will develop with resulting strand breakage. Moreover, prior art pay-out wheels have U-shaped grooves, a feature which causes the cable inserted therein to flatten into an approximately elliptical shape. The upper fibers of the cable are thus subjected to higher stresses and large amounts of cold-working.

In addition to the cold-working disadvantages explained above, conventional type apparatus produces a detrimental degree of sway in the cable suspended between the pay-out wheel and the permanent support structure when cable is being payed-out or reeled in. Also, such prior art machines are heavy and therefore uneconomical and somewhat difficult to handle.

Another disadvantage of prior apparatus arises from the inability of the level wind mechanism to automatically accommodate cables of varying or different diameters. A manual adjustment is required when the cable size changes.

The general object of my invention is to provide a cable stringing apparatus that obviates the above-mentioned disadvantages of prior art apparatus.

Another object of my invention is to provide a cable stringing apparatus that is light weight, easy to operate and economical.

Another object of my invention is eliminate the necessity for multiple wraps or turns of the cables and thus prevent fatigue failures and the attendant problems that accompany cold-working.

Another object of my invention is to provide a pay-out wheel having a groove construction that lessens the amount of cold-working of the cable.

Another object of my invention is to provide a cable stringing apparatus that minimizes cable sway to protect the cable.

Another object of my invention is to provide a level wind mechanism capable of accommodating cables of different or varying diameters and even the splicing devices on said cables.

These and other objects are affected by my invention as will be apparent from the following description taken in accordance with the accompanying drawings, forming a part of this application, in which:

FIG. 4 is a plan view of the mechanism of FIG. 3;

FIG. 5 is a sectional view taken at line V—V of FIG. 3;

FIG. 6 is a schematic hydraulic flow diagram for the apparatus;

FIG. 7 is a schematic hydraulic flow diagram for apparatus used to control the attitude of the pay-out wheel;

FIG. 8 is a cross-sectional view of a preferred form of groove for the pay-out wheel; and FIG. 9 is a cross-sectional view of the groove of FIG. 8 showing the groove deformation upon applying a large tension load to the inserted cable.

Figure 1:
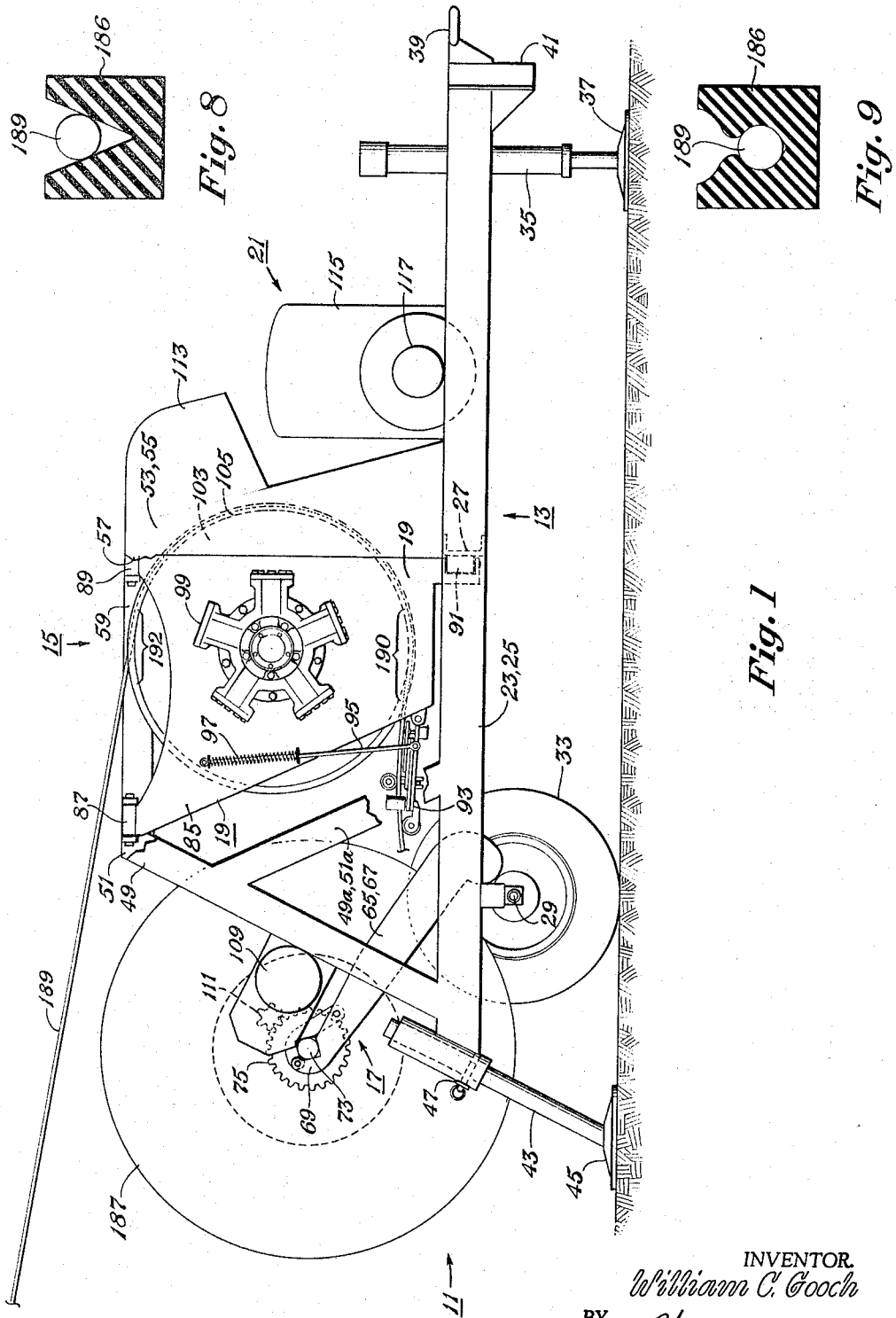
FIG. 1 is a schematic elevational view of a cable stringing apparatus constructed in accordance with the principles of my invention.

Referring to the drawings, FIG. 1 illustrates a cable stringing apparatus 11 which includes: a main frame 13; a superstructure 15; a cable reel support structure 17; a pay-out wheel support structure 19; and a power source 21.

The main frame 13 comprises a pair of side rail members 23, 25 which are connected at the front or right hand end (as viewed in FIG. 1) and which are transversely connected by a plurality of rigid cross members 27. At the rear end, the frame 13 is supported on an axle 29 on which a pair of wheels 31, 33 are mounted in the usual manner. The front end of the main frame 13 may be supported, when in operational use, by a pivotable strut 35 to which is mounted a ground engaging pad or foot 37. The front end of the frame is also provided with a conventional towing eye 39 and a towing eye support bracket 41. To the rear end of each one of the side rail members 23, 25 there is fixed an adjustable leg or strut mechanism 43, which has a ground engaging pad or foot 45 affixed to the lower end. A removable pin 47 is provided for insertion into matching holes in the strut mechanism to lock it in selected operative positions.

Figure 2:
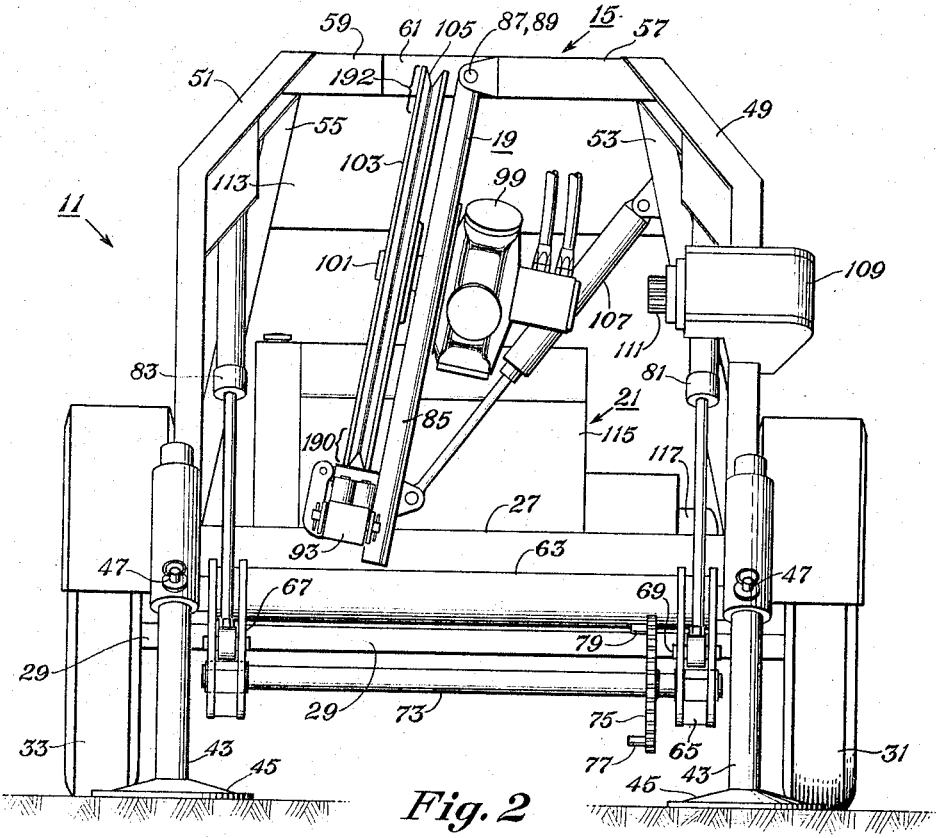
FIG. 2 is a schematic, simplified rear view of the apparatus of FIG. 1, with the cable reel removed.

The superstructure 15 comprises a pair of knuckled rear leg members 49, 51, a pair of diagonal brace members 49a, 51a, and a pair of straight front leg members 53, 55; one end of each leg being fixed to a respective side rail member 23, 25 as may be seen in FIGS. 1 and 2. The upper ends of the leg members on each side are connected to and support horizontal, longitudinal platform structures 57, 59 which are disposed in spaced apart parallel longitudinal relation at a common level above the main frame 13. The front ends of the horizontal platform structures 57, 59, however, are connected together by a transverse beam 61, as may be noticed by referring to FIG. 2.

The cable reel support structure 17 comprises a transversely disposed torque tube 63, which is suitably journaled at each end to a respective side frame member 23, 25. Adjacent the ends of the torque tube 63, there are fixed outwardly and rearwardly projecting arm structures 65, 67. The rear end of each arm structure is provided with a suitable releasable type of journal 69 which will readily hold and support the ends of a transversely extending cable reel shaft or tube 73. It will be apparent from FIG. 2 that a shaft drive gear 75 is fixed on the shaft 73 adjacent the right hand end, and that the drive gear 75 has a pair of inwardly projecting pins 77, 79 fixed thereto for a purpose that will be explained hereinafter. It will be noticed also from FIGS. 1 and 2 that the respective arm structures 65, 67 are pivotally connected to a pair of piston cylinder assemblies 81, 83 which are anchored to the superstructure rear legs 49, 51.

The pay-out wheel support plate 19 comprises a heavy trapezoidal shaped plate structure 85 which is pivotally mounted to the inner edge of the horizontal platform 57 on a pair of spaced apart hinge devices 87, 89. The plate 19 is suspended from the hinge devices 87, 89 with the smaller parallel edge of the structure 85 at the bottom, and the front edge of the plate 19 is disposed substantially perpendicular to an axis through the hinge devices. As may be seen in FIG. 1, there is suitably fixed to the lower front portion of the plate structure 19 a bracket and roller assembly 91 which is disposed in such a manner so that the roller portion is free to rotate about an upright axis. The roller thereof also continuously engages the front vertical side of one of the transverse cross members 27 as the plate structure 19 pivots about the aforementioned axis.

The upward and rearward sloping edge of the plate structure 19 supports a pay-out wheel control and level-wind mechanism 93, which is pivotally connected thereto, adjacent the lower rear corner of the plate structure. As is shown in FIG. 1, the level-wind mechanism 93 is also pivotally connected to one end of a biased rod 95 that is resiliently suspended on a coil type spring 97 which cooperates with the upper portion of the rod to provide vertical alignment of the cable, as may be noticed in FIG. 1.

A radial type of hydraulic drive motor 99 is fixed to one side of the plate 19 at a convenient location near the center thereof, and the hydraulic drive motor has an output shaft 101 which projects through a suitable aperture in the plate structure. One satisfactory type of radial hydraulic motor is manufactured and marketed by Chamberlain Industries Ltd., London, England. Of course, other kinds and types of prime movers may be used if desired.

A single cable stringing pay-out wheel 103 is suitably mounted on the output shaft 101 and has a single V-shaped, circumferential groove 105 which is substantially parallel to and spaced apart from the plane of the plate 19. As seen in FIG. 2, the groove 105 is formed preferably in a ring of resilient material which encircles and is fixed to the periphery of the pay-out wheel 103. A piston and cylinder assembly 107 is pivotally connected to the plate structure 19 in the lower front corner region and to the right side of front leg 53, as shown in FIG. 2.

The V-shaped groove has two important functions; (1) it lessens the possibility of fatigue cracks by decreasing cold-working and (2) it enables the use of a single groove wheel, a feature which further decreases cold-working.

Prior art, U-shaped grooves flattened the cable into a roughly elliptical shape, especially when the groove and the cable were of different diameters. This subjected the outer fibers of the cable to higher stresses by decreasing the radius around which they turned. I have discovered that by using a V-groove the cable either remains almost circular in cross-section or becomes somewhat egg shaped with the egg longitudinal axis extending radially of the wheel, with the larger end outward. Thus, the cable is not flattened and the outer fibers are not subjected to the increased stresses that accompany U-shaped grooves. Consequently, I have succeeded in reducing the amount of cold-working and the accompanying fatigue problems.

I define "V-groove" to mean a groove in the periphery of the pay-out wheel that in cross-section has walls that converge toward the rotational axis of the pay-out wheel. The groove has a bottom configuration, generally stress relieved, that has clearance from the cable. The walls of the groove need not be straight lines in cross-section but may be slightly curved.

In addition, I have found it beneficial to form the V-groove of single pay-out wheels of a resilient material. Numeral 186 in FIGS. 8 and 9 refers to the annular ring of resilient material that extends circumferentially around the pay-out wheel 103. The resilient material for a typical pay-out wheel is about four inches by four inches in transverse cross-section. A satisfactory V-groove may have an included angle varying in a range from substantially 40 to 60 degrees and the material has characteristics equivalent to rubber (this of course includes rubber) having a durometer hardness in a range varying from 60 to 80. In most instances the V-groove performs better if the included angle ranges from 43 to 51 degrees and the durometer hardness ranges from 65 to 75. Preferably, the included angle is approximately 45 degrees and the durometer hardness is approximately 70 (a one-eighth inch radius has been found suitable for use in the bottom of the groove). A distance across the upper portion of the groove of two and one-half inches is commonly used. This groove configuration accommodates cable of different diameter which is an important feature, since diameters of one-half to one and three-fourths inches are common.

The frictional forces between the cable and the pay-out wheel are increased to a surprising amount by using a resilient material V-groove of the type discussed above. In a test, a 48-inch diameter pay-out wheel having the preferred V-groove construction held 7,000 pounds of tension on the pay-out side, with 150 pounds of tension on the section of cable spanning the pay-out wheel 103 and cable reel 187. The tension capacity may be somewhat increased by enlarging the pay-out wheel diameter since the frictional forces developed are a function of the circumference of this wheel.

As shown in FIG. 9, the rubber flows around the cable 189 as tension increases. About 75 percent of the circumference of the cable is covered by the rubber when large tensions are used, a feature which greatly increases the frictional forces. Surprisingly, the rubber has a long life even when subjected to frequent deformation. Thus, I have successfully provided a long lasting pay-out wheel that requires only one groove.

A detailed operational description will be given later but it should be initially understood that the purpose of the level wind mechanism 93 is first to sense lateral movements of the cable as it is wound or unwound on or from cable reel 187. The sensed movements are then transmitted through the hydraulic circuit to the hydraulic cylinder 107 that pivotally moves the pay-out wheel lower portion 190 into continuous alignment with the cable. This keeps the cable wound neatly on the cable reel and prevents damage to the cable. The entire mechanism for maintaining the receiving portion of the pay-out wheel in continuous alignment with the cable as it is unwound from or wound upon the cable reel, may be termed a guide mechanism.

The pivotal axis (pivot pins 87, 89) of the pay-out wheel 103 is adjacent its pay-out portion 192. Thus, lateral cable movements are diminished, and minimized. Although the pay-out portion 192 and the pivotal axis of the pay-out wheel are illustrated at the top region of the wheel, it is apparent that they could be reversed with the position of the receiving portion 190. The essential feature is that the pay-out portion be adjacent the pivotal axis of the pay-out wheel.

It will be noticed from FIGS. 1 and 2, that a gear motor reduction unit 109, having an output pinion 111, is fixedly mounted to the rear leg 49 and projects generally to the rear of the frame 13. The gear motor 109 is so mounted that both the pinion 111 and the drive gear 75 secured to the reel shaft 73 lie in the same longitudinal plane for a reason that will become later apparent.

Across the front end of the superstructure 15 and adjacent the top edge thereof, is secured a conventional type of tank structure 113 in which hydraulic operating fluid may be carried.

The power source 21 is mounted on and fixed to the main frame 13 at a convenient location near the front end thereof, and it includes a conventional type of prime mover 115, which may be a diesel engine, a gasoline engine, or any other suitable type of prime mover. The prime mover is drivingly connected to a hydraulic fluid pump 117 that is operatively connected to the supply tank 113, the several piston-cylinder assemblies, the hydraulic drive motor 99 and the gear motor 109, generally in accordance with the schematic arrangement shown in FIG. 6.

Figure 3:
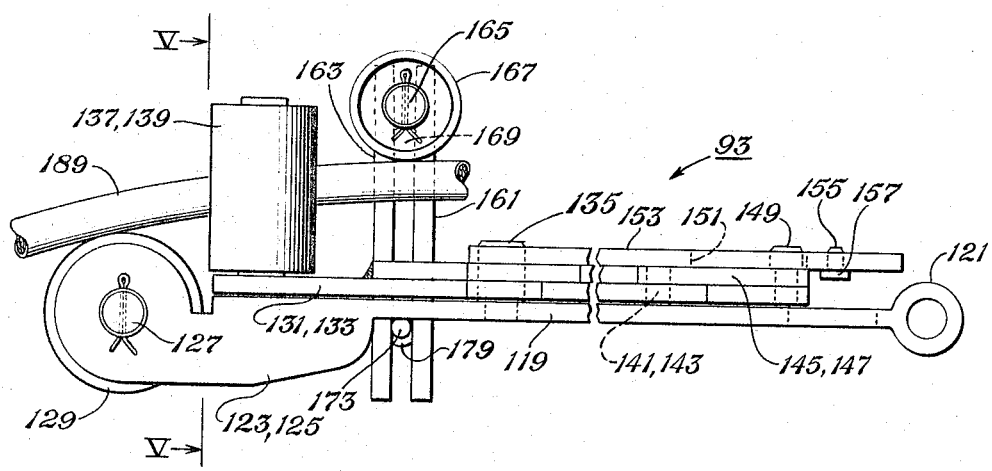
FIG. 3 is a schematic elevational view of the pay-out cable motion sensing mechanism.

The level wind mechanism 93 is illustrated in more detail in FIGS. 3, 4, and 5, and includes a rectangular shaped main support plate 119, which is provided with a pivot or gudgeon 121 fixed thereto across one end. A pair of spaced apart parallel cable roller support plates 123, 125 are fixed to the other end portion of the plate 119, and they depend perpendicularly from the bottom surface of the plate as indicated in FIG. 4. These roller support plates 123, 125 have generally rounded ends in which a shaft 127 is suitably journaled and on the shaft 127 a horizontal cable engaging guide roller 129 is suitably mounted.

To the upper surface of the main support plate 119, there is secured a pair of legs 131, 133 which are crossed and pivotally connected by a pivot pin 135, in the same manner as the blades of a pair of scissors, the pivot pin being also suitably fixed to the main support plate 119. It is not essential that the legs 131, 133 be crossed, but this is convenient since only one pivot pin is then required.

That end portion of each leg 131, 133 which is adjacent the horizontal roller 129 supports a respective cable engaging roller 137 or 139, each of which is mounted to the respective legs in mutual confrontation and for rotation about a vertical axis. The opposite ends of the legs 131, 133 are pivotally connected at 141, 143 to a pair of connecting link members 145, 147 which are pivotally connected at their free ends by a pivot pin 149. The pivot pin 149 is disposed to slidably move in a longitudinal elongated slot 151 in an arm 153 that is also pivotally connected to the pivot pin 135. The free end of the arm 153 is also pivotally connected at 155 to a valve actuator 157 that is suitably connected to a conventional type four-way fluid control valve V2.

Adjacent the vertical rollers 137, 139 and at the left side thereof, there is secured to the main support plate 119 a pair of vertically disposed, spaced apart parallel plates 161, 163. Pivotally mounted to the upper end portions of thes plates is a roller support structure 165 on which another cable engaging roller 167 is suitably journaled. The support structure 165 is disposed between the vertical plates 161, 163 and is pivotally connected thereto by a pivot pin 169.

To the right and just below the pivot pin 169 (as viewed in FIG. 5) is provided a roller stop bar 171, which is disposed between and suitably fixed to the support plates 161, 163. There is also disposed between the vertical plates 161, 163 a short pin or stub shaft 173 which is fixed to and projects toward the left (see FIG. 5) from just beneath the main support plate 119. This stub shaft 173 is axially aligned with another similar pin or stub shaft 175 that is provided on the lower end of a keeper key 177 which is pivotally mounted between the plates 161, 163. It is convenient to support a compression type spring 179 around the pins 173, 175 as shown in FIG. 5. The keeper key 177 is therefore resiliently biased to pivot about a pivot pin 181, and the upper end of the keeper key, which is chamfered as at 183, engages a matching chamfered edge on the roller support structure 165. It is convenient to provide adjacent the upper end of the keeper key 177, a short transverse finger engaging bar 185 which is useful for manipulating the keeper key when necessary.

To understand the mode of operation of the apparatus, reference may be made initially to FIG. 1. The apparatus 11 is connected to and towed behind another work vehicle (not shown), and is located in line with the general direction of the new cable to be installed. The work vehicle is braked in a set position and the apparatus normally is not disconnected therefrom. The front end strut member 35 and pad 37, and the rear strut members 43 and pads 45 are extended and positioned to engage the ground. When properly positioned the several struts are locked in such position by means of the locking pins 47. The apparatus 11 should, if possible, be set in a substantially level position.

The next step in the procedure is to actuate the prime mover 115 to energize the hydraulic fluid system. A valve V3 (see FIG. 6) is actuated to cause the reel support arm structures 65, 67 to assume a lowered attitude due to the extension of hydraulic cylinders 81, 83 as shown in FIG. 2. Then a conventional reel of cable 187 may be disposed between the arms and mounted in the usual manner on the shaft 73. The reel drive gear 75 should, of course, be positioned so that the reel drive pins 77, 79 engage corresponding holes in the adjacent flange of the reel 187. After the shaft 73 and thus reel 187 have been latched by the releasable type bearing 69, the valve V3 (see FIG. 6) may be actuated again to raise the arm structures 65, 67 and the cable reel 187 to a position as shown in FIG. 1. It will be noted that in this upper position the output pinion 111 of the gear motor 109 meshes with and actuates the gear 75. Pinion 111 and gear 75 are a brake to prevent uncontrolled rotation of cable reel 187.

The next step in the procedure is to actuate the valve V2 so that the pay-out wheel 103 is caused to pivot on the hinge mountings 87, 89 until its lower portion 190 becomes aligned with the end of a first strand of cable 189 on the reel 187. When so aligned, the first strand of cable 189 may be looped over the pay-out wheel 103 in a counter clockwise direction, as shown in FIG. 1, making sure that the cable 189 passes over the horizontal support roller 129, between the vertical rollers 137, 139 and beneath the upper horizontal roller 167 of the level wind apparatus 93. The keeper key 177 is pivotally moved toward the left (as viewed in FIG. 5) so that the roller 167 may be freely pivoted upward to allow the cable 189 to be placed between the vertical rollers 137, 139. Then, the roller 167 may be returned to its horizontal position and the keeper key will resiliently return to the vertical restraining position shown in FIG. 5. It will be noticed that the roller 167 cannot fall below a horizontal attitude because the roller stop bar 171 engages the roller support structure 165, and the roller cannot move upward because the keeper key 177 is resiliently urged into engagement with the roller support structure 165 along the chamfered edge 183 and so, the roller 167 is releasably maintained in a horizontal and operative attitude.

The next step in the procedure is to attach a conventional pilot line to the end of the cable 189 to pull the cable up and over the transmission towers. This may be readily accomplished by a second apparatus 11 which is placed at the other end of the cable span, and which is disposed similarly to the apparatus shown in FIG. 1. The second apparatus, however, supports an empty take-up reel. The pilot line embraces the pay-out wheel on the second unit, passes through a similar level-wind mechanism, and is connected to the take-up reel in the usual manner. Then, by operating the second apparatus as a pulling device and operating the first apparatus as described herein the cable 189 will be unwound from the supply reel 187. It will be understood by those skilled in the art that the gear reduction motor 109 and the hydraulic motor 99 may be operated in such a manner that the desired tension is maintained in the cable.

The level wind mechanism 93 responds to the regular lateral movement of the cable as it is unwound from the supply reel and actuates the valve V2 so that the piston-cylinder assembly 107 moves to pay-out wheel lower portion 190 into continuous alignment with the cable. This is explained as follows: It will be noticed from FIG. 4 that the legs 131, 133 are pivotally mounted by the pin 135, and equal lateral movement of both of the vertical rollers 137, 139 causes a proportional equal lateral movement of the pivot pins 141, 143. Moreover, the connecting links 145, 147 (being of equal length and being pivotally connected by the pin 149) move coordinately with the ends of the legs 131, 133 and the pin 149, moves longitudinally in the slot 151. Thus, when there is equal lateral movement of the rollers 137, 139 (for example, when the cable size changes), there is no movement of the arm 153. However, let it be assumed that the cable 189, as it regularly unwinds from the cable reel 187, exerts a lateral force against the vertical roller 137. Such a lateral force will cause the pivot pin 143 to move upward (as viewed in FIG. 4) or in the opposite direction to the lateral movement of the roller 137. The lateral movement of the pin 143 causes a force transmission through link member 147 which acts on the pin 149, which in turn causes the arm 153 to pivot in a counterclockwise direction (as viewed in FIG. 4) about the pin 135. When the arm 53 moves in this direction, the valve actuator 157 actuates the four-way valve V2.

The valve V2 is operatively connected to the fluid pump 117 and the pay-out wheel piston-cylinder assembly 107 in the manner shown in FIGS. 6 and 7. It will be noticed in FIG. 7 that the valve V2 is shown in a vertical position, which is to say that fluid from the pump 117 cannot pass through the valve. However, when the valve is actuated responsive to lateral movements of the cable 189 and the level wind mechanism 93, the internal rotary gate 191 pivots clockwise, and the ports 193 and 195 are opened. Fluid may now enter the valve V2, pass therethrough on the right hand region of the rotary gate 191, and enter the hydraulic cylinder assembly 107 at the right hand end (as shown in FIG. 7).

The clockwise movement of the gate 191 also opens valve ports 197 and 199 and fluid may flow from the piston-cylinder assembly 107 via the left hand region of the valve V2 and thence to the fluid supply tank 113. When the lateral moving force of the cable ceases, the lateral movement of the link member 153 ceases and the valve actuator 157 returns to the neutral position shown in FIG. 7 and the flow of fluid via the valve V2 ceases. The same relative operation obtains when the cable reaches one flange of the supply reel 187 and starts back toward the other flange.

That the level wind mechanism 93 will act in the same coordinate manner regardless of changes in the size of cable is explained by referring to FIG. 6 and to the previous description of the mode of operation. It will be remembered that when the vertical rollers 137, 139 are moved laterally an equal distance, the pin 149 moves only longitudinally in the slot 151. Therefore, whenever cables of different sizes or splicing devices are wound on a reel and then payed-out, there will be equal lateral movements of the vertical rollers, and the level wind mechanism will readily adjust to these different size cables. Moreover, the adjustment will be made automatically and it will not be necessary to make any manual adjustments whatsoever. The level wind mechanism will also coordinately control the movement of the pay-out wheel in response to the lateral movement of the cable as it is wound or unwound from the cable reel. Moreover, this control occurs regardless of the diameter of the cable which may be cooperating with the level wind mechanism at any particular moment.

It will be noticed by referring to FIG. 4 that the cable 189 is captive between the first horizotnal roller 129, the vertical rollers 137 and 139, and the second or upper horizontal roller 165. The keeper key 177, being resiliently biased into a vertical cooperative position with the chamfered edge of the roller support structure 165, maintains the second horizontal roller 167 in a horizontal attitude until the keeper key 177 is manually or otherwise pivoted out of the cooperative position shown. When the keeper key is so pivoted, the roller 167 may also be pivoted upward and the cable 189, being captive no longer, may be removed from the level wind mechanism 93 and the pay-out wheel 103. In the same manner the horizontal roller 167 may be pivoted upward so that a new cable, or a pulling or pilot line may be looped over the pay-out wheel to commence operations.

While the apparatus 11 has been described in connection with a cable installation project, those skilled in the art will recognize that it may also be used to remove an installed cable. In this case the end of the cable to be removed is first connected to a pilot or pulling line which is looped around the pay-out wheel, through the level wind mechanism, and then connected to an empty take-up reel which has previously been positioned where the reel 187 is shown in FIG. 1. A similar apparatus may be located at the other end of the cable and, by means of a pulling line connected thereto (around the pay-out wheel and through a level wind mechanism) a proper restraining force may be exerted on the cable while the apparatus 11 is used to wind the cable on an empty cable reel.

Thus, my cable stringing apparatus is useful both to restrainably pay-out cable, and to restrainably haul in cable.

It should be apparent from the foregoing description that my invention obviates many of the disadvantages of prior art cable stringing apparatus. It is apparent that my apparatus is light weight, easy to operate and economical.

Specifically, I have provided an apparatus that eliminates the necessity for multiple wraps or turns of the cable pay-out wheel and thus have reduced cold-working of the cable and the accompanying fatigue problems.

Moreover, my groove construction further decreases the amount of cold-working by preventing the cable from appreciably flattening in cross-section. Moreover, the provision of a groove constructed of resilient material increases the frictional forces between cable and the pay-out wheel to increase the tension capacity of the apparatus.

The provision of pay-out wheel having a cable receiving portion that moves pivotally into continuous alignment with the cable as it is unwound from the cable reel, and having the pivotal axis adjacent a pay-out portion of said wheel, minimizes undesired cable sway.

In addition, my level wind mechanism can accommodate cables of varying or different diameters or even cable splicing devices without need for manual adjustment.

While I have shown my invention in only one form, it will be obvious to those skilled in the art that it is not so limited, but is susceptible of various changes and modifications without departing from the spirit thereof.

I claim:

1. An apparatus for stringing electrical power transmission cables in electric power distribution systems, said apparatus comprising:
   (a) a mobile support frame;
   (b) a cable reel rotatably secured to the support frame;
   (c) a pay-out wheel pivotally and rotatably mounted on the support frame and adapted to receive cable from cable reel and to pay-out said cable for elevated installation, said pay-out wheel having an annular groove in its periphery that is defined with reference to its radial cross-section as having walls that converge toward the rotational axis of the pay-out wheel, and as having a bottom, generally stress relieved, configuration that has clearance from the cable disposed in the groove; and (d) a guide mechanism adapted for pivotally moving said receiving portion of said pay-out wheel into continuous alignment with said cable as said cable is unwound from or wound upon the cable reel.

2. An apparatus for stringing electrical power transmission cables in electric power distribution systems, said apparatus comprising:

(a) a mobile support frame;
(b) a cable reel rotatably secured to the support frame;
(c) a single pay-out wheel having a single peripheral groove therein, said wheel being mounted for powered rotation on said support frame and for pivotal movement about an axis perpendicular to the rotational axis thereof, said pay-out wheel having a receiving portion adapted to receive the cable from said cable reel and having its groove formed of resilient material that converges inwardly in radial cross-section; and
(d) a guide mechanism adapted for pivotally moving said receiving portion of said pay-out wheel into continuous alignment with said cable as said cable is unwound from or wound upon the cable reel.

3. An apparatus for stringing electrical power transmission cables in electric power distribution systems, said apparatus comprising:

(a) a mobile support frame;
(b) a cable reel rotatably secured to the support frame;
(c) a single pay-out wheel having a single peripheral groove therein, said wheel being mounted for powered rotation on said support frame and for pivotal movement about an axis perpendicular to the rotational axis thereof, said pay-out wheel having a receiving portion adapted to receive the cable from said cable reel and having its groove formed of resilient material that converges inwardly in radial cross-section with an included angle in a range varying from substantially 40 to 60 degrees, said resilient material having characteristics of rubber of 60 to 80 durometer hardness; and
(d) a guide mechanism adapted for pivotally moving said receiving portion of said pay-out wheel into continuous alignment with said cable as said cable is unwound from or wound upon the cable reel.

4. The invention in accordance with claim 3 wherein the groove of the pay-out wheel has an included angle in a range varying from 43 to 51 degrees, said groove being formed of an elastic material having characteristics equivalent to rubber of 65 to 75 durometer hardness.

5. The invention in accordance with claim 3 wherein the groove of the pay-out wheel has an included angle of approximately 45 degrees, said groove being formed of a material having characteristics equivalent to rubber of approximately 70 durometer hardness.

6. A guide mechanism capable of accommodating cables of varying or different diameters and for pivotally moving a pay-out wheel into alignment with a cable as said cable is wound or unwound from a cable reel, said apparatus comprising:

(a) a pair of legs having parallel and identically located pivotal axes, each leg having an end portion slidably engaging the cable and in mutual confrontation with an opposed end portion on the opposite leg;
(b) an elongated arm pivotally mounted parallel to and an equal distance from the pivotal axes of said legs, said arm having a longitudinally extending slot near its free end;
(c) a pair of connecting links of equal length, each having one end portion slidably mounted in the elongated slot and an opposite end portion pivotally secured to those ends of the legs opposite the cable engaging ends; and
(d) means connected to the free end of the arm for pivotally moving said pay-out wheel responsive to the sensed lateral movement of the cable and thus the movement of said arm.

7. The invention in accordance with claim 5 wherein the means for pivotally moving the pay-out wheel comprises a valve actuator secured to the free end of the arm, a hydraulic valve connected to said valve actuator, and hydraulically operated means communicating with said hydraulic valve to pivotally move said pay-out wheel.

8. A sensing mechanism suitable for use in a guide mechanism with cable or the like of varying or different diameters, said sensing mechanism comprising:

(a) a pair of legs having parallel and identically located pivotal axes, each leg having an end portion slidably engaging the cable and in mutual confrontation with an opposed end portion on the opposite leg;
(b) an elongated arm pivotally mounted parallel to and an equal distance from the pivotal axes of said legs, said arm having a longitudinally extending slot near its free end;
(c) a pair of connecting links of equal length, each having one end portion slidably mounted in the elongated slot and an opposite end portion pivotally secured to those ends of the legs opposite the cable engaging ends; and
(d) an actuator secured to said arm for transmitting the sensed lateral movements of the cable.

References Cited by the Examiner

UNITED STATES PATENTS

| | | | |
|---|---|---|---|
| 2,326,670 | 8/1943 | Patterson | 74—230 |
| 2,703,218 | 3/1955 | Haskell et al. | 254—134 |
| 2,948,483 | 8/1960 | Petersen | 242—86 |
| 3,037,720 | 6/1962 | Leithiser | 242—155 |
| 3,073,574 | 1/1963 | Garnett | 242—86 |

FOREIGN PATENTS 770,037  3/1957  Great Britain.

FRANK J. COHEN, *Primary Examiner.*

STANLEY N. GILREATH, W. S. BURDEN,
*Assistant Examiners.*